(12) United States Patent
Hente et al.

(10) Patent No.: US 8,451,583 B2
(45) Date of Patent: May 28, 2013

(54) SCALABLE POWER DISTRIBUTOR

(75) Inventors: Dirk Hente, Wuerselen (DE); Joseph Hendrik Anna Maria Jacobs, Eygelshoven (NL)

(73) Assignee: Koninkiljke Philips Electronics N.V., Eindhoven (NL)

( * ) Notice: Subject to any disclaimer, the term of this patent is extended or adjusted under 35 U.S.C. 154(b) by 587 days.

(21) Appl. No.: 12/673,041

(22) PCT Filed: Aug. 12, 2008

(86) PCT No.: PCT/IB2008/053223
§ 371 (c)(1),
(2), (4) Date: Feb. 11, 2010

(87) PCT Pub. No.: WO2009/024892
PCT Pub. Date: Feb. 26, 2009

(65) Prior Publication Data
US 2011/0133644 A1    Jun. 9, 2011

(30) Foreign Application Priority Data
Aug. 17, 2007   (EP) ..................................... 07114534

(51) Int. Cl.
*H01G 9/00* (2006.01)
*H02B 1/00* (2006.01)
(52) U.S. Cl.
USPC ......................................... 361/434; 361/601

(58) Field of Classification Search
USPC . 315/51, 160–161, 164, 167, 169.3; 361/601, 361/434; 257/207–208
See application file for complete search history.

(56) References Cited

U.S. PATENT DOCUMENTS

| 5,949,194 A | 9/1999 | Kawakami et al. |
| 7,027,044 B2 * | 4/2006 | Lee ............................... 345/211 |
| 2004/0105264 A1 | 6/2004 | Spero |
| 2007/0125368 A1 * | 6/2007 | Silverstein .................... 126/627 |
| 2007/0176859 A1 * | 8/2007 | Cok et al. ......................... 345/76 |

FOREIGN PATENT DOCUMENTS

| DE | 19509860 A1 | 9/1996 |
| EP | 1592115 A2 | 11/2005 |
| WO | 9619093 A1 | 6/1996 |
| WO | 2007090292 A1 | 8/2007 |

* cited by examiner

*Primary Examiner* — Minh D A
(74) *Attorney, Agent, or Firm* — Mark L. Beloborodov

(57) ABSTRACT

The invention relates to an elongated power distributor (100) adapted to provide electrical power to an OLED device (104), the power distributor (100) comprising—a set of power cells (102), wherein the power cells (102) are arranged along the power distributor (100), each of the power cells (102) being adapted to provide substantially identical operating currents or voltages to the OLED device (104), and—means for mechanically fixing the power distributor (100) to the OLED device (104).

19 Claims, 7 Drawing Sheets

SCALABLE POWER DISTRIBUTOR

TECHNICAL FIELD

The invention relates to an elongated power distributor adapted to provide electrical power to an OLED device, an illumination device and a method of assembling a power distributor according to the invention.

BACKGROUND AND RELATED ART

Lightning devices based on OLED technology are becoming more and more competitive to well known technologies such as fluorescent and inorganic LEDs. An important selling point for the general illumination market is the device scalability within a specific product range: for a given basic characteristic of a lighting device such as a color temperature and brightness, different sizes of such a device are required to illuminate areas of different sizes.

Corresponding to the various sizes of a lighting device, the driver which delivers the necessary current for a specific brightness needs to be adapted as well. Typically, the driver is specifically designed for a given product range or individually for a specific device. However, the usage of such a kind of specialized driver has several disadvantages. For example designing a single driver for a complete range of lighting devices always implies a design for maximum power, i.e., the driver is usually oversized for smaller devices and thus not very efficient. Also, designing a driver individually for every specific lighting device is expensive and increases cost for storage and maintenance, because many different types of drivers have to be managed.

A further drawback is the bulkiness of a single device driver, i.e., it is hard to realize a very thin driver. The thickness of an OLED device, however, is a unique selling point compared to other lighting technologies such as fluorescent and inorganic LEDs. Designing a single driver for an OLED device will destroy this advantage because it is not possible to design a driver of several tens of watts within a thickness of only a few millimeters.

Yet another drawback of the single driver solution is the fact, that high currents need to be distributed over large areas. For example, an OLED device with an efficiency of 50 µm per watt and a required brightness of 1,500 µm requires a total power of P=1,500 lm/50 lm/W=30 W. Assuming an OLED characteristic with a forward voltage of 3 V, the total current flowing is I=1 A/m². A square resistance of $R_{sq}=1\Omega$ would result in a voltage drop of about $R_{sq} \cdot I/2 = 0.5$ V. The result of such a voltage drop would be a significant brightness drop, which is an unacceptable effect in commercial applications.

In order to improve the situation, it is beneficial to have more than one injection point for the current to avoid unwanted voltage drops.

For example US 2004/0105264 A1 discloses a method and apparatus comprising a multiple light source illuminating device using LEDs.

WO 96/19093 discloses a current consumption control system for controlling the current draw of an electric power consuming device, e.g., a modular strip lighting unit for a lighting system including at least one said unit, in which the strip lighting unit includes at least one light element operatively coupled to the lighting unit.

SUMMARY OF THE INVENTION

It is an object of the present invention to provide a thin elongated power distributor to be easily connected to one or more OLEDs enabling the OLEDs to emit a homogeneous brightness.

The object is solved by an elongated power distributor adapted to provide electrical power to an OLED device, the power distributor comprising a set of power cells, wherein the power cells are arranged along a power distributor, each of the power cells being adapted to provide substantially identical operating currents to the OLED device and means for mechanically fixing the power distributor to the OLED device. Thereby, it is also possible that the power cells are adapted to provide substantially identical operating voltages to the OLED device.

The elongated power distributor according to the invention has the advantage, that it can be used for a modular assembly with an OLED device. The power distributor is an assembly part structurally separated from the OLED device, such that independent from the device structure of the OLED device a universal elongated power distributor can be provided. Depending on the total power demand of the OLED device, upon assembly the power distributor can be separated into pieces. The power distributor piece itself represents a fully functional distributed converter with a total power handling capability corresponding to the number of power cells comprised in said power distributor piece. Therewith, the power distributor represents a scalable power converter which adapts itself automatically in 'power cell' increments to the power requirements of OLEDs of various sizes just by changing the length of the individual pieces. No redesign is required which allows to produce illumination devices comprising OLEDs with reduced development costs regarding the power distribution in such an illumination device.

The elongated power distributor structure also allows designing drivers with very small mounting heights, since a rather bulky high-power driver is substituted by a set of small drivers. Moreover, there is the option to have multiple current injection points, so that undesired voltage drops in the OLEDs can be avoided.

It has to be mentioned, that even though the power cells are adapted to provide substantially identical operating currents to the OLED device, the power cells are also individually capable of being tuned to individual operating currents. This can for example be a requirement, if an OLED device comprises different OLED tiles with each tile having a different operating current requirement which may for example be due to different illumination color, different illumination power or even due to different sizes of the individual tiles.

In accordance with an embodiment of the invention, the elongated power distributor further comprises a set of predetermined breaking points, wherein the breaking points are spatially located between neighboring power cells. Using breaking points has the advantage that predefined cutting lines exist which allow an easy shortening of the power distributor in order to be adapted to the length and size of the OLED device. Hence, long stripes of elongated power distributors can be produced by a manufacturer, which during assembly for production of the illumination device are broken or cut into pieces of a desired length. Thereby, such a predetermined breaking point can be realized by a predefined weakening of the power distributor substrate at the predetermined spatial locations between neighboring power cells.

In accordance with an embodiment of the invention, the power distributor further comprises a first cooling strip, the first cooling strip being adapted for dissipation of heat originating from the power cells and/or the OLED device. This has the advantage, that an overheating of the power cells due to the conversion of high power supply voltages to operating currents of the OLED device, as well as an overheating of the OLED device itself is avoided. For example, the cooling strip can be arranged along the elongated power distributor with close contact to the power cells in order to allow for an effective heat dissipation.

Regarding a cooling strip design, various possibilities exist. For example the substrate of the elongated power distributor can be manufactured of a highly thermal conductive material. Another possibility is to arrange a separate cooling strip made of a highly thermal conductive material on top of the power distributor. Preferably, the cooling strip comprises a multitude of cooling fins which can be used to highly effectively dissipate heat to the environment.

In accordance with an embodiment of the invention, the power distributor is adapted for assembly with a support, wherein the support is adapted for receiving the OLED device. This again has the advantage, that the elongated power distributor can be used to manufacture illumination devices in a modular assembly type. OLED devices can be designed independently of the power distributors with the only requirement, that the OLED devices have respective connecting points in order to allow the power cells of the power distributor to contact with the OLED device.

In accordance with an embodiment of the invention, the power distributor further comprises a control input, the control input being adapted to receive control commands from a master control unit. Controlling the power distributor by a center master controller has the advantage, that a supervision of the individual power cells is possible, which is for example required in order to individually address tiles of OLEDs regarding illumination power, on/off switching, changing color etc.

In accordance with another embodiment of the invention, the power distributor further comprises first means for electrically connecting the power cells to the OLED device, wherein the first means for electrically connecting the OLED device comprise first spring contacts. Using spring contacts has thereby the advantage, that it is possible to establish an electric contact between the individual power cells comprising the spring contacts and the OLED device itself. For example the power distributor and the OLED device can be simply clipped together, wherein the flexible and elastic spring contacts guarantee a well defined electrical connection between the power cells and the OLED device itself.

It has to be mentioned here, that regarding an assembly of the OLED device and the power distributor basically two main architectures exist: the first architecture is a direct assembled power distributor on the OLED device, which means that the OLED device and/or the power distributor itself needs to possess a sufficient mechanical stability. Then it is possible that the power distributor is directly clipped onto respective counterparts of the OLED device and the electrical contact between the power cells and the OLED device is directly established via for example said spring contacts. The second architecture is the above mentioned usage of the support, wherein the support receives separately the OLED device and the power distributor.

In accordance with an embodiment of the invention, the power distributor further comprises the support profile, the support profile being adapted for receiving the OLED device. This means, that either the power distributor can already be designed as a support profile which is adapted for receiving the OLED device, or the power distributor can be for example clipped or glued or vibration welded to an existing support profile. Using a power distributor in combination with the support profile corresponds to the above mentioned second architecture.

In accordance with an embodiment of the invention, the support profile further comprises second means for electrically connecting the power cells to the OLED device. The second means for electrically connecting to the OLED device can for example comprise second spring contacts. By using the second spring contacts preferably in combination with the above mentioned first spring contacts of the power distributor it is possible to realize a simple assembly of the power distributor with the OLED device via the support profile.

In accordance with an embodiment of the invention, the support profile further comprises first and second engaging means, the first engaging means being adapted for locking the OLED device to the support profile and the second engaging means being adapted for locking the power distributor to the support profile. This preferably in combination with the usage of spring contacts allows for developing a plug system to simply plug the OLED device and the power distributor into the support profile without the need of further mechanically fixing the resulting illumination device. This allows for an assembly of illumination devices in a cheap manner, since the OLED device manufacturing, power distributor manufacturing and assembly can be realized decentralized.

In accordance with an embodiment of the invention, the support profile further comprises means for receiving a second cooling strip, the second cooling strip being adapted for dissipation of heat originating from the power cells and/or the OLED device. This has the advantage that heat originating from the power cells and/or the OLED device can be dissipated in a highly effective manner, since the second cooling strip is spatially closely located to the power cells and the OLED device. The cooling strip can either be adapted as a separate structural component or it can be integrated into the support profile. For example, the substrate of the support profile can have a high thermal conductivity and cooling fins such that the support profile itself acts as heat dissipater.

In another aspect, the invention relates to an illumination device comprising an OLED device and a power distributor according to the invention. Thereby, the OLED device may comprise one large OLED tile or a set of OLED tiles comprising a multitude of OLEDs.

In another aspect, the invention relates to a method of assembly of a power distributor according to the invention and an OLED device, the method comprising applying the power distributor to the OLED device. Thereby, as already mentioned above the power distributor can be directly assembled onto the OLED device, or a support profile can be used, wherein the OLED device is applied to the support profile and a power distributor is applied to the support profile.

In accordance with an embodiment of the invention, the method further comprises electrically contacting the OLED device and the power distributor, the contacting being performed by welding or soldering or gluing techniques. However, for an easy assembly it is preferred to use spring contacts since due to the contact pressure of the springs an additional fixing of the electrical contacts is not necessary.

In accordance with an embodiment of the invention, the welding is performed by ultrasonic welding. Thereby, the ultrasonic welding can be used to simultaneously fix the OLED device to the power distributor itself, and at the same time to establish the electrical contacting using the same ultrasonic welding process. This can also be extended to using an interjacent support profile. In this case, using one ultrasonic process, the OLED device, the support profile and the power distributor are welded and fixed together.

In accordance with an embodiment of the invention, the method further comprises shortening of the elongated power distributor. This is necessary, if the power distributor is provided as a continuous ribbon such it has to be adapted to the size of the OLED device it is applied to.

BRIEF DESCRIPTION OF THE DRAWINGS

In the following preferred embodiments of the invention are described in greater detail by way of example only making reference to the drawings in which:

In the following, similar elements are depicted with the same reference numerals.

FIG. 1 is a schematic of an OLED illumination device. The OLED illumination device comprises an OLED device 104 which comprises an array of small OLED tiles 105. Each OLED tile comprises a U-shaped anode area 106 and a single sided cathode area 108 which can be electrically contacted in order to operate the OLED tile 105.

The OLED illumination device further comprises a power distributor 100 which itself comprises a set of power cells 102. In FIG. 1 two power distributors are arranged along the top and bottom edges of the OLED device 104. The power cell 102 has at least two contacts 110, one electrical contact to the anode area 106 and one electrical contact to the cathode area 108. However, in order to improve the electrical contact itself, the power cells 102 in FIG. 1 comprise two electrical contacts to the anode area 106 and one electrical contact to the cathode area 108. Multiple current injection points have the advantage, that a uniform distribution of electrical currents within the anode or cathode area is achievable. This is especially important if OLED tiles 105 with larger spatial dimensions are used.

Figure 1:
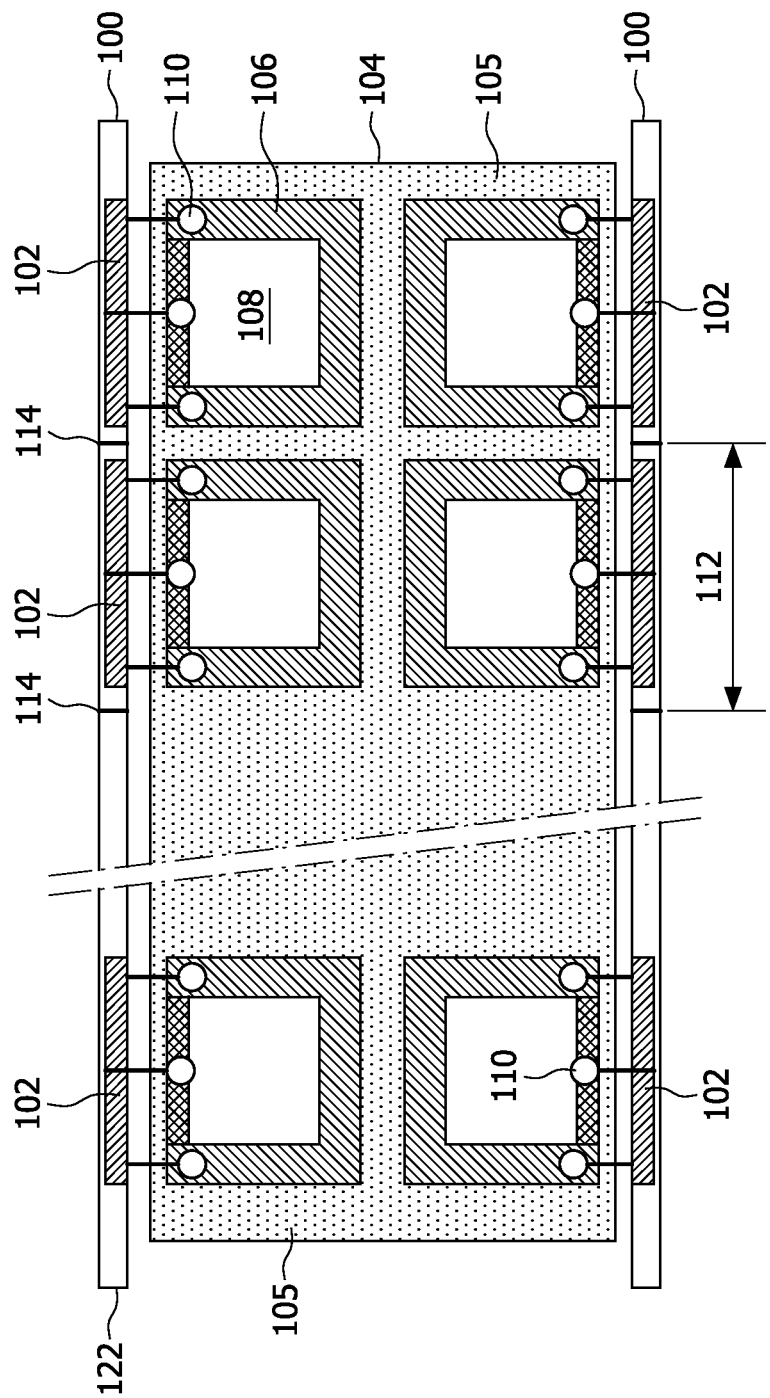
FIG. 1 is a schematic of an OLED illumination device.

In the present embodiment of FIG. 1 the power cells 102 are arranged spatially in series along the power distributor 100 with the same distance 112. However, since a manufacturer of the power distributor 100 may deliver power distributors in much longer elongated dimensions than the length of the OLED device 104 itself, the power distributor 100 needs to be shortened to the correct length of the OLED device 104. For this purpose, the power distributor 100 comprises a set of breaking points 114 with the breaking points being spatially located between two neighboring power cells 102. In the present example of FIG. 1, at the distal end 122 of the power distributor 100 the power distributor 100 is cut and therewith shortened to be adjusted to the length of the OLED device 104 using a respective breaking point 114 which is located at said distal end 122.

Figure 2:
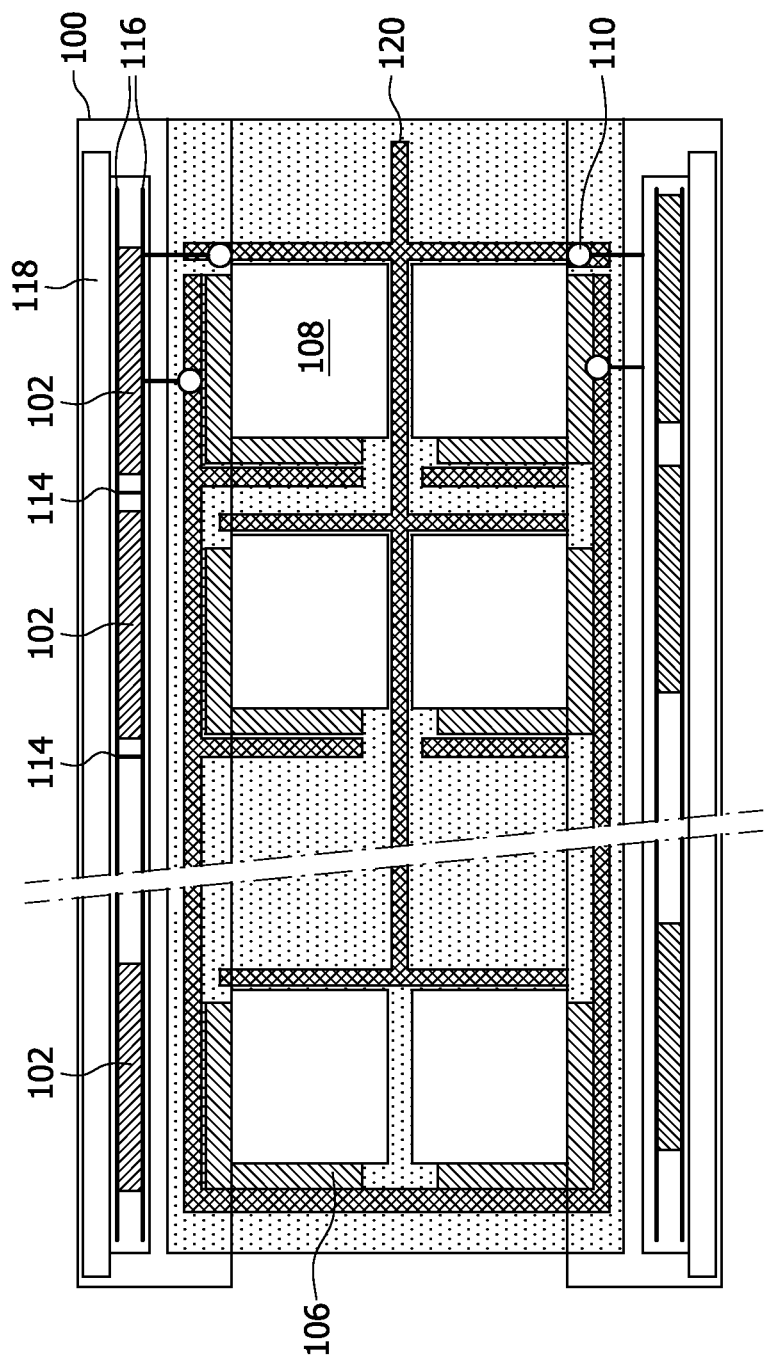
FIG. 2 is a further schematic of an OLED illumination device.

FIG. 2 is a further schematic of an OLED illumination device. Thereby, the basic structure of the power distributor 100 corresponds to the structure of the power distributor 100 of FIG. 1. Additionally in FIG. 2 it is shown that the power cells 102 of the power distributor 100 are electrically contacted with electrical conduction lines 120, which typically carry a high current to an external power supply (not shown here). Thereby, the electrical conducting lines 116 are connecting in parallel the power cells. Preferably the power cells 102 are adapted to provide substantially identical operating currents to each of the OLED tiles 105 of the OLED device 104. However, this does not exclude the possibility that the power cells 102 are individually adapted to provide a certain operating current to respective OLED tiles 105.

A further difference of FIG. 2 to FIG. 1 is that the power distributor 100 further comprises a cooling strip 118. The cooling strip 118 is spatially located on the power cells 100 and is elongated along the power distributor 100. Heat originating from the power cells 102 is therefore efficiently dissipated by the cooling strip 118.

Further, in FIG. 2 a low ohmic interconnection scheme on the OLED device 105 is shown. The interconnect electrical conduction lines 120 which are used to connect the anode and cathode areas of the OLED tiles 105, respectively are used to improve the current distribution along the edges of the OLED tiles 105. The power cells 102 are arranged at the long side of the OLED device. Multiple connection points 110 are used for injecting current into the bus bar structure. In this case, the possibility to control the OLED tiles 105 individually is lost. Nevertheless, this allows for a highly efficient power distribution for all OLED tiles 105 with extremely low ohmic losses, which allows for an extremely thin design of the power cells—the entirety of the power cells provide sufficient power in order to drive the OLED device and a bulky single high power device driver can be abandoned.

Figure 3:
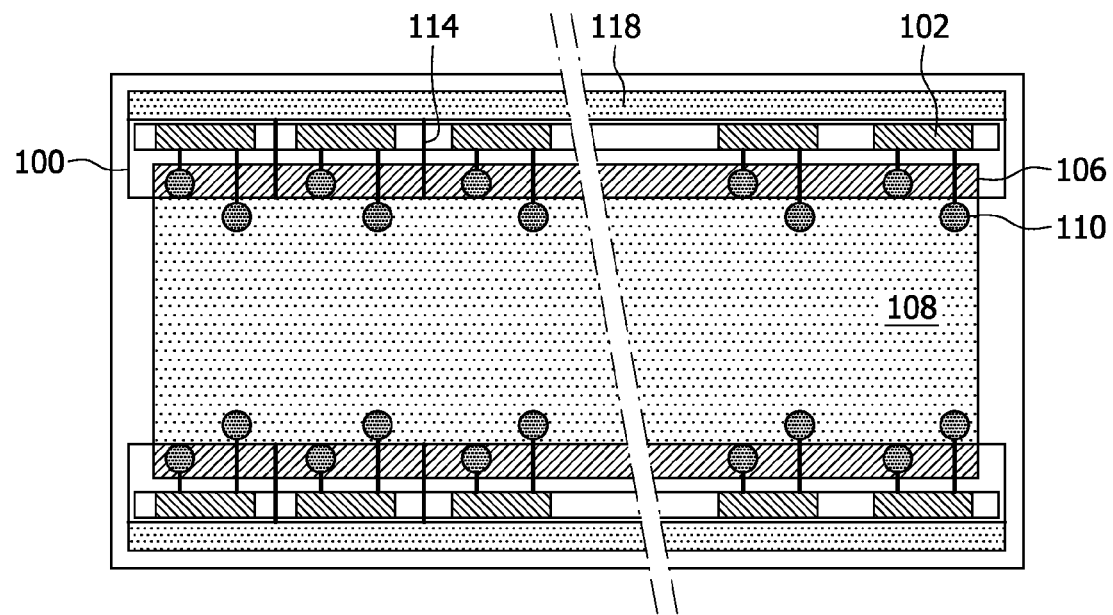
FIG. 3 is a further schematic of an OLED illumination device.

FIG. 3 is a further schematic of an OLED illumination device. Compared to FIG. 1 and FIG. 2, in FIG. 3 there is only one large OLED tile which can for example be a monolithic large area OLED device. Two power distributors 100 comprising multiple power cells 102 with respective connecting points 110 are arranged along the top and bottom edge of the OLED device. By injecting current not only at one single point, here a solution is shown to improve the uniformity of current distribution along the edges. Instead of injecting several amperes at one injection point, as known from state of the art OLED devices, a multitude of points are used each injecting only a fractional amount of the total current which is needed to drive the OLED device. Since the voltage drop across a bus bar of an interconnection scheme is proportional to the current, the utilization of a multitude of injection points reduces the voltage drop significantly. For example, the usage of N injection points reduces the voltage drop by a factor of N.

In the following, an arithmetic example is given which illustrates the application of multiple power cells 102 for driving an OLED device 104. For a luminaire with a given area A the number of cells $N_C=A/F_C$ determines how much power cells have to be used to drive the whole OLED device. The power cells are mounted on a single substrate material endlessly, wherein each power cell covers a specific length $L_{PT}$. The power cells repeat themselves every $L_{PT}$ along the substrate material. In the present example, the substrate material is part of the power distributor 100. Using the breaking points 114 the substrate material can be cut every $L_{PT}$ so that a power distributor of length $L_{PD}=N_C \cdot L_{PT}$ can deliver a total power of $P=N_C \cdot P_{CELL}$. Assuming a long small rectangular OLED device of length $L_{OLED}$, the power distributors are favorably placed along the edges of the OLED device. In this case, a total power distributor length of $L_{PD}=2 \cdot L_{OLED}$ is used.

If the OLED is a square shaped device of size $L_{OLED} \cdot L_{OLED}$, it is advantageous to place the power distributors along all four edges of the square shaped OLED. In this case, the total length for the power distributor is $L_{PD}=4 \cdot L_{OLED}$. Assuming a 1 m² OLED a power distributor of length $L_{PD}$=0.5 meters for the rectangular OLED and 0.25 meters for the square OLED is required.

Figure 4:
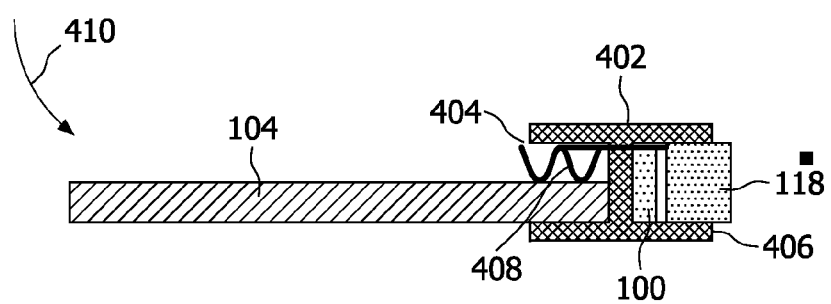
FIG. 4 is a cross section of an OLED illumination device comprising a support profile.

FIG. 4 is a cross section of an OLED illumination device comprising a support profile 402. Thereby, the support profile 402 is adapted as a frame bar with two opposite U-shaped notches adapted for receiving on one side with the first opening 404 the OLED device 104 and on the opposite side with the second opening 406 the power distributor 100. In the embodiment of FIG. 4, the power distributor 100 comprises a cooling strip 118. However, it is also possible that a second cooling strip is already incorporated in the support 402 by means of respective cooling fins.

Further, the support 402 comprises a set of spring contacts 408 which are adapted for connecting the power cells of the power distributor 100 with the anode and cathode areas of the OLED device 104. In the present example, only spring contacts 408 are present on the first opening 404 which is adapted for receiving the OLED device 104. This allows inserting the OLED device 104 into the opening 404 via a tilting movement of the OLED device 104 in the direction 410. Preferably, the support has respective engaging means at the opening 404 which allow for example to snap in and lock the OLED device 104 to the support 402.

The same argumentation holds for the second opening 406 of the support 402 which is adapted for receiving of the power distributor 100 and its cooling strip 118. For example, similarly to the first opening 404 the second opening 406 may also comprise spring contacts which allow a simple inserting of the power distributor 100 into the opening 406. Preferably, the second opening 406 further comprises engaging means which are used to lock the power distributor 100 and fix it to the support 402. The cooling strip 118 can also be clamped into the support profile 402 and therewith onto the power distributor 100.

It has to be mentioned, that FIG. 4 is only a schematic so that the detailed electrical contacting of the OLED device 104 using the spring contacts 408 with respect to the anode and cathode area of the OLED device 104 is not depicted in detail. However, assuming a rectangular OLED device the depicted support is preferably arranged as a frame along all four edges of the OLED device therewith ensuring a high mechanical stability of the resulting illumination device. Depending on the requirements the support can be a closed frame around the complete OLED substrate, thus building a complete OLED device including driver. Alternatively, the support profile is a part of a luminaire extending only at the top and bottom of the OLED device. It might even be movable so that the OLED itself is exchangeable.

Figure 5:
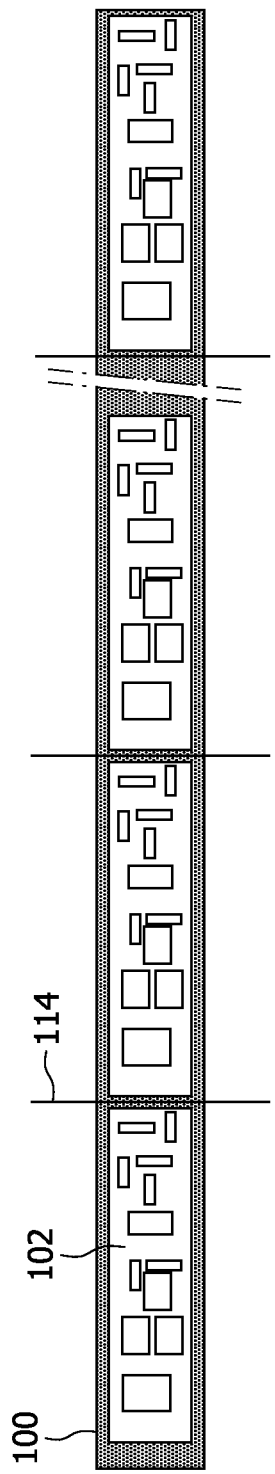
FIG. 5 is a schematic of an elongated power distributor.

FIG. 5 is a schematic of an elongated power distributor 100. The power distributor 100 shows a repeated power cell architecture 102. On a base substrate a power cell 102 is arranged representing a power converter, for example a DC/DC converter of type Buck, Boost, Flyback or a resonant. Each power cell 102 is designed to deliver a specific current to a specified OLED area of fixed size and characteristic. The individual power cell 102 is repeated on the substrate. The number of power cells is theoretically unlimited. Depending on the power demand the power distributor 100 can be separated into pieces at predefined cutting lines 114. This way it is possible to scale the power distributor 100.

Figure 6:
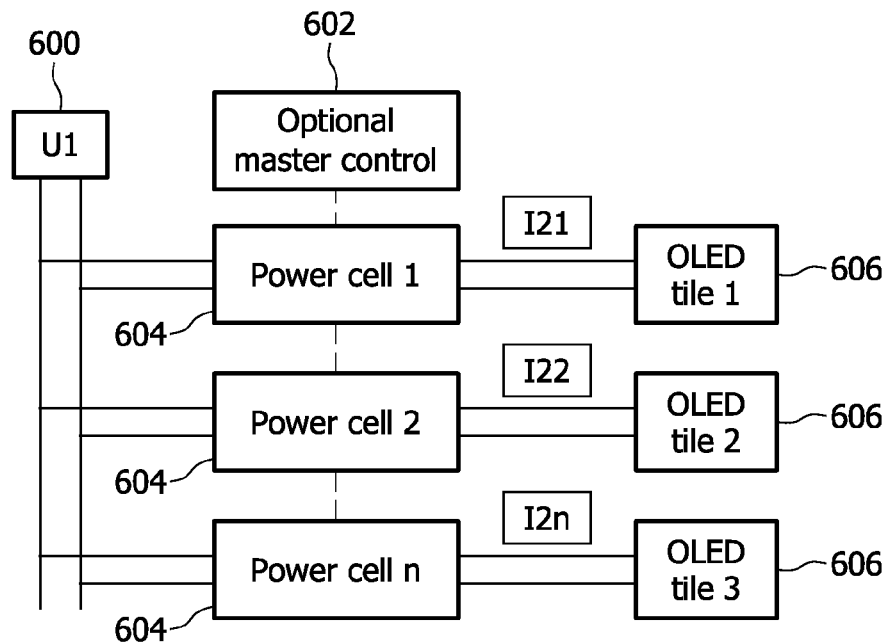
FIG. 6 is a block diagram of a wiring architecture for an OLED illumination device.

FIG. 6 is a block diagram of a wiring architecture of an OLED illumination device. This architecture is especially suitable for tiled OLEDs as shown in FIG. 1. A power supply unit 600 provides electrical power to the individual power cells 604. Optionally, the power cells 604 are controlled by a master control unit 602 which can control the current and voltage which is provided by the individual power cell 604. In the present example of FIG. 6, each power cell 604 is individually connected to an OLED tile 606.

The voltage U1 delivered by the power supply unit 600 is converted to a voltage I21, I22, . . . , I2n by the power cell 604 and delivered to the respective OLED tiles 606. This allows for an individual control of the tiles 606.

Figure 7:
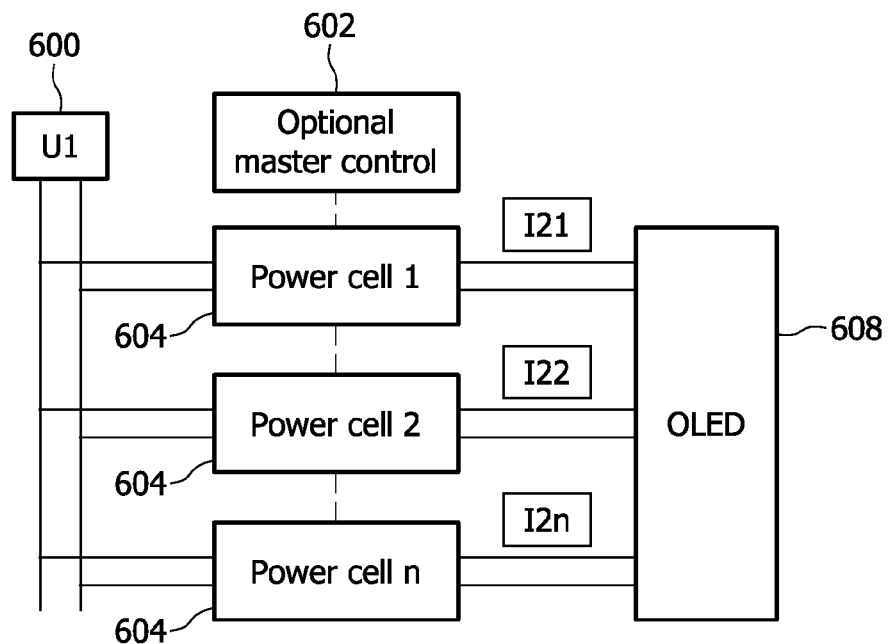
FIG. 7 is a block diagram of a wiring architecture for an OLED illumination device.

FIG. 7 is a block diagram of a wiring architecture for another OLED illumination device. Compared to FIG. 6, there is only one large OLED tile 608 present. Therefore, the wiring architecture of FIG. 7 corresponds to the OLED device depicted in FIG. 3. As already discussed for FIG. 3, multiple connection points are used injecting current at different spatial locations along the edge of the OLED device 608. The master control unit 602 can be used to control the operating currents which may be common to all power cells 604. Alternatively the operating currents I21, I22, . . . , I2n may also be controlled individually in order to compensate for nonlinear current distributions in the OLED device 608.

Figure 8:
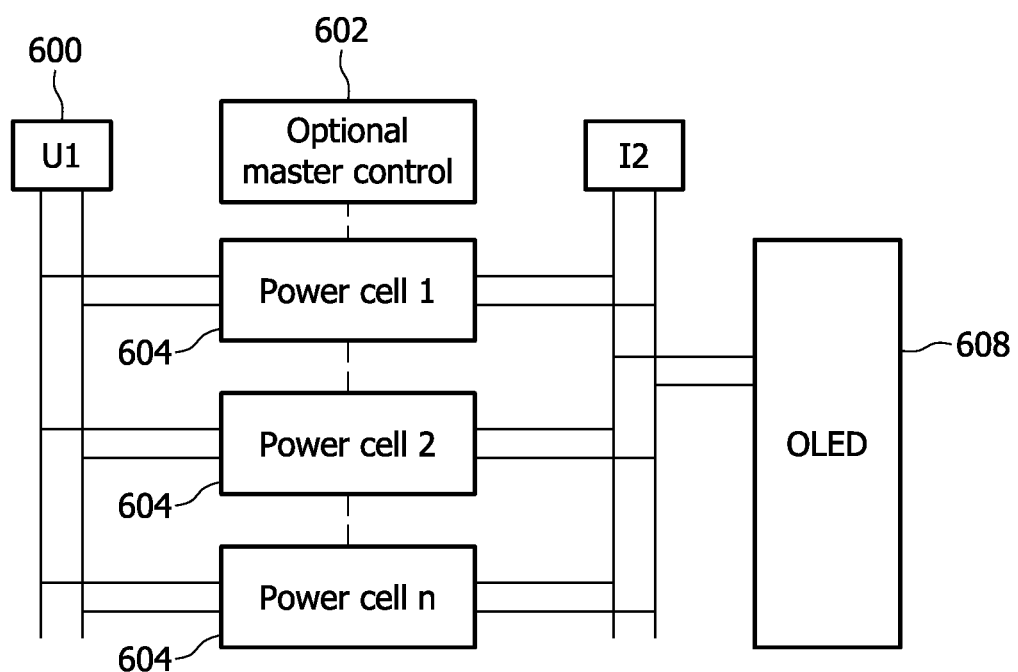
FIG. 8 is a block diagram of a wiring architecture for an OLED illumination device.

FIG. 8 is a block diagram of another wiring architecture for an OLED illumination device. In FIG. 8, the large monolithic OLED 608 comprises only a single connection point for current injection. In this embodiment, the output currents of the individual power cells 604 are interconnected in order to yield one output current I2. This output current I2 is then supplied at the single connection point to the OLED 608. Even though, this architecture allows reducing ohmic losses in the electrical conducting lines to the OLED tile 608, since a uniform current distribution within the OLED tile 608 is difficult to obtain, the architecture of FIG. 7 is preferred over the architecture of FIG. 8. Nevertheless, the architecture of FIG. 8 has the advantage that even with one current injection point the construction design of the power cells can be kept thin by a distribution of multiple power cells in an elongated way along the OLED device 608. This means, that instead of using one bulky power cell a thin power cell architecture can be realized which is an important aspect with respect to one of the unique selling points of OLED devices, namely their extremely flat construction design.

Figure 9:
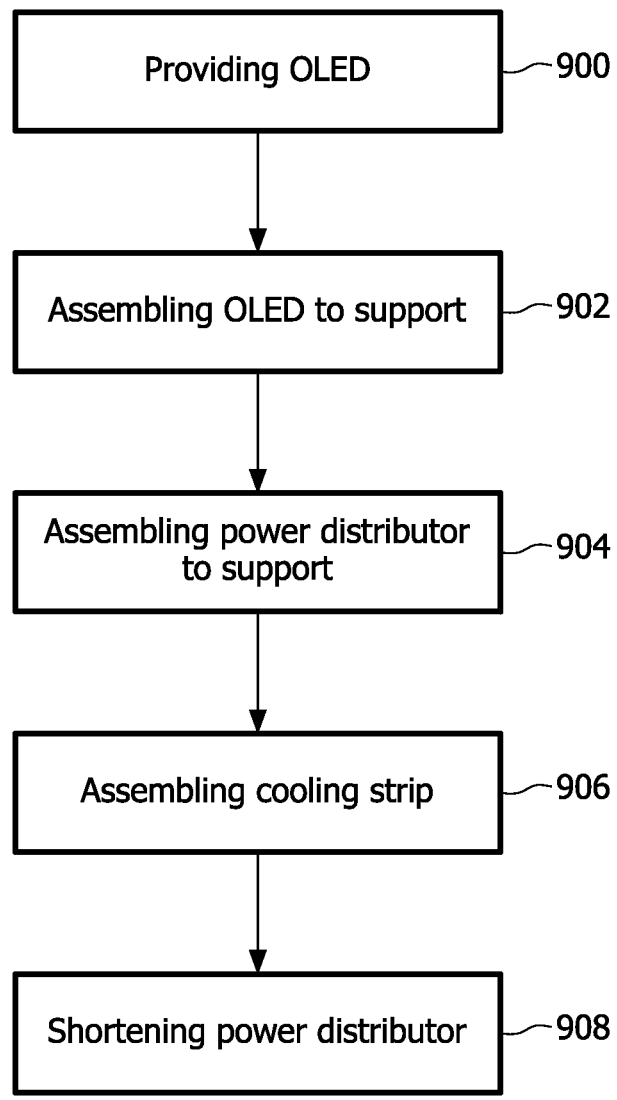
FIG. 9 is a flowchart of a method of assembly of an OLED illumination device.

FIG. 9 is a flowchart of an exemplary method of an assembly of an OLED illumination device. In step 900, an OLED device is provided. The OLED device is assembled to the support in step 902 for example by clamping or gluing the OLED to the support. In step 904, the power distributor is also assembled to the support already comprising the OLED. Similarly to step 902, in step 904 the assembly of the power distributor to the support is performed by clamping or gluing or other fixing techniques. In step 906, a cooling strip is additionally assembled to the power distributor and/or the support. Finally in step 908, the power distributor which typically has a length much longer than the support itself which serves as a frame for the OLED device is shortened to the correct length.

Depending on the illumination device architecture, several steps in the flowchart of FIG. 9 can be omitted. For example, the OLED and the power distributor may be adapted to be assembled directly together. In this case, a support is not necessary which however requires a respective high mechanical stability of the power distributor and/or the support. For example, the support may be reinforced using a thin substrate.

Also the assembly of the additional cooling strip in step 906 is optional, since it is possible to already provide a power distributor comprising such a cooling strip.

In order to fix the OLED to the support, to fix the cooling strip to the power distributor and to fix the power distributor itself to the support, as well as in order to establish a good electrical connection between the power cells of the power distributor and the respective contact areas of the OLED, fixing of the respective point of contacts can be performed by welding or soldering or gluing techniques. Thereby, preferably the welding is performed by ultrasonic welding.

The step 908 of shortening the power distributor can be performed before assembly of the power distributor to the support in step 904.

LIST OF REFERENCE NUMERALS

100 Power distributor
102 Power cell
104 OLED device
105 OLED tile
106 Anode area
108 Cathode area
110 Contact
112 Distance
114 Breaking point
116 Electrical conduction line
118 Cooling strip
120 Electrical conduction line
122 End
402 Support
404 First opening
406 Second opening
408 Spring contact
410 Direction
600 Power supply unit
602 Master control unit
604 Power cell
606 OLED tile
608 OLED tile

The invention claimed is:

1. An elongated power distributor for providing electrical power to an OLED device, the power distributor comprising
   a set of power cells, wherein the power cells are arranged along the power distributor, each of the power cells providing substantially identical operating currents or voltages to the OLED device,
   a set of predetermined breaking points, wherein the breaking points are spatially located between neighboring power cells, and
   means for mechanically fixing the power distributor to the OLED device.

2. The power distributor according to claim 1, further comprising a first cooling strip configured for dissipation of heat originating from the power cells and/or the OLED device.

3. The power distributor according to claim 1, wherein the power distributor is adapted for assembly with a support profile, wherein the support profile is adapted for receiving the OLED device.

4. The power distributor according to claim 1, further comprising a control input for receiving control commands from a master control unit.

5. The power distributor according to claim 1, further comprising first means for electrically connecting the power cells to the OLED device, wherein the first means for electrically connecting to the OLED device comprises first spring contacts.

6. The power distributor according to claim 1, further comprising a support profile for receiving the OLED device.

7. The power distributor according to claim 6, wherein the support profile further comprises second means for electrically connecting the power cells to the OLED device.

8. The power distributor according to claim 7, wherein the second means for electrically connecting to the OLED device comprises second spring contacts.

9. The power distributor according to claim 6, wherein the support profile further comprises first and second engaging means, the first engaging means being adapted for locking the OLED device to the support profile and the second engaging means being adapted for locking the power distributor to the support profile.

10. The power distributor according to claim 6, wherein the support profile further comprises means for receiving a second cooling strip, the second cooling strip being adapted for dissipation of heat originating from the power cells and/or the OLED device.

11. An illumination device comprising an OLED device and a power distributor according to claim 1.

12. The illumination device according to claim 11, wherein the OLED device comprises a set of OLED tiles.

13. An elongated power distributor for providing electrical power to an OLED device, the power distributor comprising:
   a set of power cells, wherein the power cells are arranged along the power distributor, each of the power cells providing substantially identical operating currents or voltages to the OLED device,
   a first cooling strip configured for dissipation of heat originating from the power cells and/or the OLED device, and
   means for mechanically fixing the power distributor to the OLED device.

14. An illumination device comprising an OLED device, including a set of OLED tiles, and a power distributor according to claim 13.

15. The power distributor according to claim 13, further comprising a support profile for receiving the OLED device.

16. The power distributor according to claim 15, wherein the support profile further comprises second means for electrically connecting the power cells to the OLED device.

17. The power distributor according to claim 16, wherein the second means for electrically connecting to the OLED device comprises second spring contacts.

18. The power distributor according to claim 15, wherein the support profile further comprises first and second engaging means, the first engaging means being adapted for locking the OLED device to the support profile and the second engaging means being adapted for locking the power distributor to the support profile.

19. The power distributor according to claim 13, wherein the support profile further comprises means for receiving a second cooling strip, the second cooling strip being adapted for dissipation of heat originating from the power cells and/or the OLED device.

* * * * *